Oct. 23, 1945.  C. R. WASEIGE  2,387,628
RETRACTABLE TAIL LANDING GEAR FOR AIRCRAFT
Filed Feb. 14, 1942
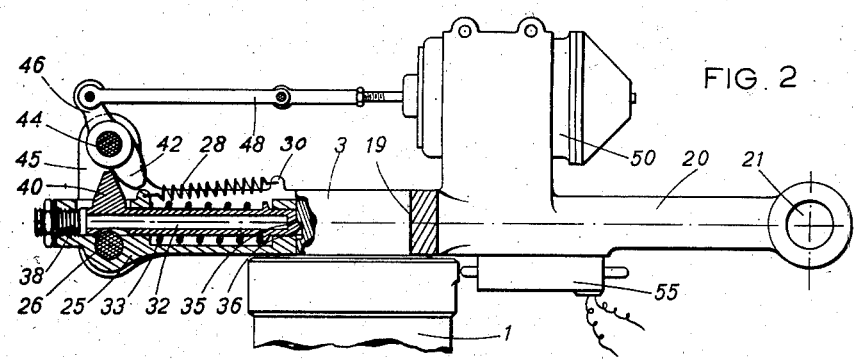
FIG. 2
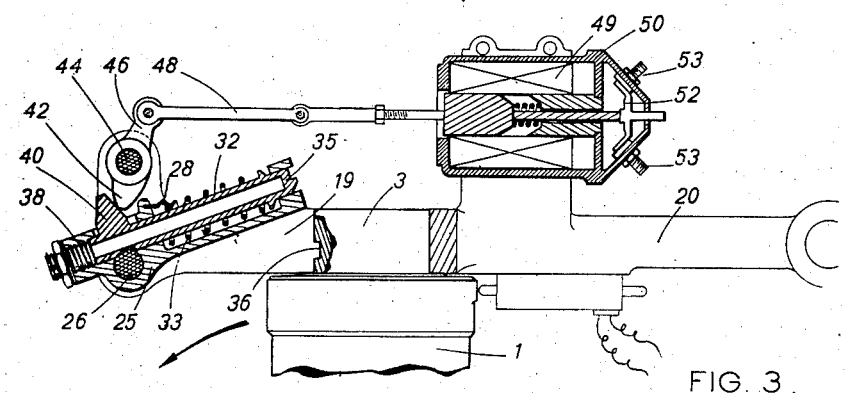
FIG. 3.
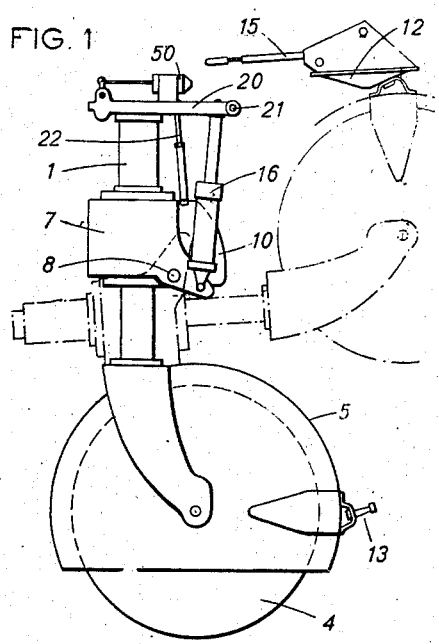
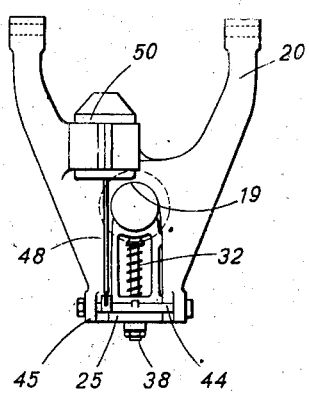
Inventor
C. R. Waseige
By Glascock Downing Keebler
Attys Patented Oct. 23, 1945

2,387,628

UNITED STATES PATENT OFFICE 2,387,628

RETRACTABLE TAIL LANDING GEAR FOR AIRCRAFT

Charles Raymond Waseige, Rueil, France; vested in the Alien Property Custodian

Application February 14, 1942, Serial No. 430,970
In France May 29, 1940

15 Claims. (Cl. 244—102)

This invention relates to retractable tail landing gears for aircraft of the kind comprising a wheel or the like carried by a supporting frame, acting as a shock-absorber, and mounted so as to be able to swing between a low or working position and a high or retracted position in response to the operation of a suitable controlling means; and more particularly to the landing gears of this type in which said controlling means comprises a spring device (pneumatic jack or the like) which is constantly under tension and accumulates energy during the lifting movement in order to restore it during the lowering movement, and locking systems for assuring the maintaining of the supporting frame in either position.

In such tail landing gears, it is important that the locking system for locking the supporting frame in its low position be not only able to firmly and safely maintain the supporting frame when the air craft rolls on the ground but that it be able to easily unlock said frame when it is desired to retract the landing gear to its high position after taking-off.

It has been suggested, with a view to effecting this locking, to use a tilting member, pivoted to turn around a horizontal axis on the aircraft structure, which has a cap to fit over the top of a terminal boss on the supporting frame in its working position. A safe locking may thus be obtained. However, in view of the fact that the end sheath of the supporting frame bears with great pressure upon the supporting area of this tilting member when transmitting to the latter the strains to which said frame is subjected, the power necessary for lifting said tilting member and unlocking said frame may attain considerable values.

One of the objects of this invention is to remove the drawbacks of the known devices and to provide a locking system which is of simple construction, which safely maintains the landing gear in working position and which requires but a small power for unlocking the supporting frame in order to effect the lifting thereof.

In accordance with this invention, the sheath end of the supporting frame in working position is held pressed against the bottom of a substantially horizontal U-shaped or the like socket formed in a bracket member, by a spring device, and is retained in this position by a block closing at least partially the opening of said socket, said block being urged towards its working position but being adapted to be retracted, preferably by a swinging motion, on the one hand automatically, near the end of the lowering travel of the landing gear, so as not to hinder the lowering of said gear to its working position, and on the other hand in response to the operation of a controlling device, when the gear is operated for lifting.

According to another feature of this invention, said block may be combined with a locking bolt co-operating with the sheath of the supporting frame for automatically locking these two parts together as the gear reaches its low position.

A single control preferably assures successively the retraction of the bolt and that of the block.

This single control may be so correlated with that of the gear lifting mechanism that the latter operates only subsequently to the retraction of the block.

In a preferred embodiment, the locking bolt is carried by the block and an electromagnet operates a rocking cam which co-operates with the tail of said bolt and is so shaped that, responsive to the cam, said tail causes the bolt to slide and retract until arrested by an abutment, and then to swing together with said block, a contactor being preferably provided for closing the circuit of the lifting mechanism at the end of the travel of said electro-magnet.

Other features and advantages of the invention will be apparent from the following description hereinafter of an example illustrated in the annexed drawing, in which:

Fig. 1 is a schematic elevational view of a tail landing gear according to this invention;

Figs. 2 and 3 show on a larger scale, partially broken away, the device for holding the gear in working position, and in retracted position, respectively, Fig. 4 is a plan view of this device.

In accordance with the embodiment shown, the landing gear comprises a supporting frame 1, acting as a shock absorber, the upper part of which terminates on a cylindrical boss 3 and the lower part of which carries a landing wheel 4, protected by a mudguard 5. The supporting frame 1 is mounted in a clamp collar 7 keyed to the shaft 8 of the lifting mechanism, of any suitable type, contained in a housing 10, by means of which mechanism said frame can be lifted to its high position, shown by dotted lines in Fig. 1.

The frame 1 is held in its high position by a locking device consisting of a keeper 12, a co-operating finger 13 carried by the mudguard and a hand controlled operating device 15 for disengaging the keeper.

A spring device, such as the pneumatic jack 16, which is constantly under tension and accumulates force during lifting, is connected to the clamp collar 7 so as to control the lowering of the landing gear. The whole device may be of any known type and will need no further description.

In the working position, the landing gear comes to rest against the bottom of a horizontal U-shaped bracket 20 and is held pressed against said bottom by the jack 16. A U-shaped socket 19 is formed in the bracket 20, the latter being supported at the ends of its arms by a shaft 21 mounted on the structure of the aircraft, said bracket being locked relatively to the housing 18 of the lifting mechanism by means of an arm 22, of adjustable length. The open end of the U-socket 19 is closed by a block or shoe member 25 the inner end of which is shaped to conform with the boss 3 when in working position. Said block 25 is fulcrumed on a pivot pin 26 mounted on the bracket 20 across the socket 19. A spring 28 is stretched between an ear on the block 25 and a projection 30 on the bracket 20 and urges said block in the direction of its working position. A longitudinal bore provided in the block 25 serves as a guide for a sliding bolt 32 whose head 35 is urged outwardly by a spring 33. The bolt head 35 co-acts with a slot or groove 36 provided on one side of boss 3.

The sliding movement of the bolt 32 towards the boss is limited by an adjustable abutment formed by the end of a screw 38 co-operating with a screwthread provided in the block 25 outwardly from the bolt 32. The bolt has a tail 40 projecting upwardly and co-operating with a rounded cam 42 keyed to a pivot 44. This pivot is supported spacedly above the pivot 26 by a pair of ears 45 as provided on bracket 20 and has an arm 46 to which is pivoted a link 48 connected with the core of an electromagnet 49 whose frame is flanged to the bracket 20. Said core is integrally connected with a contactor 52 adapted to bridge two contacts 53 at the end of its travel, said contacts being mounted in series in the control circuit of the lifting mechanism. A plunger switch 55 attached to the bracket 20 is adapted to be closed by the frame 1 when the boss 3 comes to rest in the socket 19.

The relative positions and sizes of the various elements are such that the energizing of the electromagnet responsive to the operation of the landing gear lifting mechanism causes the landing gear to operate as follows, starting from its low position, as shown in Figs. 1 and 2, where it is pressed against the bottom of the bracket 20 by the constantly tensioned jack 16.

In the first part of the operative movement of the magnet core the cam 42 pushes on the tail 40, causing the bolt 32 to slide outwardly until it engages with the abutment screw 38, whereupon said cam imparts to the block 25 a swinging movement around its pivot 26, this being facilitated by the rounded form of the cam. The parts are then in the position shown in Fig. 3 and, on reaching the end of its operative movement, the magnet core bridges the contacts 53, thereby closing the circuit of the landing gear lifting mechanism. When the landing gear reaches its high position in which it is to remain locked, as shown in Fig. 1, the control circuit is opened, so that the block 25 is returned to its low position by the action of the spring 28.

To lower the landing gear, the control 15 is operated to unlock the same, whereat the jack 16 or the like brings the landing gear down to its working position. As the boss 3 engages with the underside of the block 25, said block will be lifted against the action of spring 28 and as said boss comes into final position in the socket 19, the block 25 falls back and the bolt 35 is then projected into the groove in the boss by the spring 33, whereby the landing gear is thus locked in its low position.

At the same time, the contactor 55 also effects the closing of a circuit for controlling an indicator device of any suitable type.

While I have illustrated and described the preferred form of construction for carrying my invention into effect, this is capable of variation and modification, without departing from the spirit of the invention, and I therefore do not wish to be limited to the precise details of construction set forth but desire to avail myself of such variations and modifications as come within the scope of the appended claims.

What I claim is:

1. In a retractable tail landing gear for aircraft, including a ground engaging member, a supporting and shock absorbing frame carrying said member and mounted to be rockable from a depressed working position to an elevated retracted position, means for locking said frame in its depressed position, said locking means comprising a bracket arranged to extend transversely with respect to said frame in the depressed position of the frame, and formed with a recess, said frame having a part adapted to be conformably received by said recess while the frame is in its depressed position, a locking member arranged to prevent said part from disengaging from said recess whereby to lock the frame in its depressed position, said locking member being movable from the locking position, and means for actuating said locking member.

2. In a retractable tail landing gear for aircraft according to claim 1, resilient means urging said frame to its depressed working position and arranged to press said frame part in said recess.

3. In a retractable landing gear for aircraft according to claim 1, a constantly tensioned fluid operated jack one end of which is attached to the frame, a supporting member for attachment of the other end of said jack, arranged so that the jack will urge the frame towards its depressed position and press said frame part in said recess.

4. In a retractable tail landing gear for aircraft according to claim 1, resilient means arranged to be energised by the retraction of said frame for returning the frame to its depressed position and to remain partly energised thereafter so as to press said frame part in said recess.

5. A retractable tail landing gear for aircraft, according to claim 1, wherein said locking member is pivoted to said bracket and said actuating means includes resilient means urging it to pivot toward its locking position.

6. A retractable tail landing gear for aircraft, according to claim 1, wherein said actuating means includes resilient means urging said locking member to its locking position and said locking means are so arranged that the locking member, when in its locking position, is engaged by the frame on its way to its depressed position and thereby temporarily moved out of said locking position against the tension of said resilient means so as to permit said frame part to enter said recess.

7. A retractable tail landing gear for aircraft, according to claim 1, wherein said actuating means includes an electro-magnet carried by said bracket, and control means for said electro-magnet.

8. A retractable tail landing gear for aircraft, according to claim 1, wherein said locking means further comprises a bolt carried by said locking member, a catch mounted on said frame and arranged to engage said bolt in the locking position of the locking member, means urging said bolt to its bolting position, and means arranged to retract said bolt against the tension of said resilient means.

9. A retractable tail landing gear for aircraft, according to claim 1, wherein said locking means further comprises a bolt carried by said locking member, a catch mounted on said frame and arranged to engage said bolt in the locking position of the locking member, thereby bolting the latter, resilient means urging said bolt to its bolting position, said actuating means further being arranged to retract said bolt against the tension of said resilient means.

10. A retractable tail landing gear for aircraft, according to claim 1, wherein said actuating means includes resilient means urging said locking member to its locking position and an electro-magnet carried by said bracket and operatively connected to said locking member to actuate it against the tension of said resilient means, and control means for said electro-magnet, said control means including switch means responsive to the position of a member of the landing gear and controlling the electro-magnet in such a manner that the latter can be energised only when the landing gear is in its depressed working position.

11. A retractable tail landing gear for aircraft, according to claim 1, wherein said locking means further comprises a bolt carried by said locking member, a catch mounted on said frame and arranged to engage said bolt in the locking position of the locking member, thereby bolting the latter, resilient means urging said bolt to its bolting position, said actuating means including a cam arranged to retract said bolt against the tension of said resilient means prior to said means actuating said locking member to open the recess, an electro-magnet having its movable part connected to said cam to operate the same in response to energisation of the magnet, means for moving the landing gear to its retracted position and control means therefor, said control means including a switch arranged to be actuated to closed position by said movable part of the magnet, the stroke therefor of said movable part being greater than that for retracting the bolt.

12. A retractable tail landing gear for aircraft, according to claim 1, wherein said locking means further comprises a bolt carried by said locking member, a catch mounted on said frame and arranged to engage said bolt in the locking position of the locking member, thereby bolting the latter, resilient means urging said bolt to its bolting position, said actuating means including a single cam arranged to retract said bolt against the tension of said resilient means, and means affording thereafter an operative relation between said cam and the locking member.

13. A retractable tail landing gear for aircraft, locking means as in claim 1, further comprising a bolt carried by said locking member, a catch mounted on said frame and arranged to engage said bolt in the locking position of the locking member, thereby bolting the latter, resilient means urging said bolt to its bolting position, said actuating means including a single cam arranged to retract said bolt against the tension of said resilient means, a stop mounted on said locking member for engagement by said bolt and to thereby limit its retraction stroke, and whereby an operative connection is provided between the cam and the locking member through the medium of said bolt, said cam being arranged to remain in operative relation with the bolt so as to thereby provide for moving the locking member out of its locking position.

14. In a retractable landing gear for aircraft, a landing member, a supporting frame carrying said member and mounted to be rockable between a depressed working position wherein the landing member may assist in supporting the airplane and an elevated retracted position, means for locking said frame in its depressed working position comprising a fork-shaped bracket extending tangentially with respect to the rocking axis of the frame and in the plane of swing of the frame, the closed end of the recess defined between the arms of the fork being arranged to receive a portion of said frame only in the depressed position of the frame, and a latching element to hold said portion of the frame in said recess whereby the frame is locked in its depressed working position, and means for moving said latching element from its locking position whereby the frame may be swung to its retracted position.

15. In an aircraft retractable landing gear of the type involving a ground engaging element, a shock absorbing frame effectively supporting said ground engaging element relative to the aircraft and pivoted on the aircraft for swinging in a vertical plane between an elevated retracted position to a depressed working position, operating means for elevating and depressing said frame, means for locking said frame in its depressed working position comprising a bracket supportably connected to the aircraft and formed with a recess whose opening is positioned to conformably receive a portion on the upper part of said frame only in the depressed working position of said frame, a spring tensioned block on said bracket normally closing the opening of said recess and arranged to be displaced by the movement of said portion of the frame as the frame moves toward its depressed position whereby the said portion of the frame is admitted into said recess, a spring pressed latch carried by said block, detent means on said portion of the frame with which the latch lockably engages while said portion is confined in the recess whereby movement of the frame from its depressed working position is positively precluded, and means for withdrawing said latch to permit said portion of the frame to displace said block and move out of said recess as said operating means is actuated to elevate said frame into its retracted position.

CHARLES RAYMOND WASEIGE.